United States Patent
Hao et al.

(10) Patent No.: US 8,011,917 B2
(45) Date of Patent: Sep. 6, 2011

(54) COMPRESSION MOLDING OF AN ELECTRONIC DEVICE

(75) Inventors: Ji Yuan Hao, Singapore (SG); See Yap Ong, Singapore (SG); Jian Xiong Su, Singapore (SG); Teng Hock Kuah, Singapore (SG); Ee Ling Chiw, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 354 days.

(21) Appl. No.: 11/746,291

(22) Filed: May 9, 2007

(65) Prior Publication Data

US 2008/0277829 A1 Nov. 13, 2008

(51) Int. Cl.
*H01L 21/56* (2006.01)
*A01J 21/00* (2006.01)

(52) U.S. Cl. .......... 425/398; 425/89; 425/125; 425/127

(58) Field of Classification Search .......... 425/89, 425/125, 127, 398
See application file for complete search history.

(56) References Cited

U.S. PATENT DOCUMENTS

| | | | |
|---|---|---|---|
| 4,008,029 A * | 2/1977 | Shokite | 425/157 |
| 4,105,736 A * | 8/1978 | Padovani | 264/153 |
| 4,637,811 A * | 1/1987 | Fortney | 493/167 |
| 5,326,243 A * | 7/1994 | Fierkens | 425/116 |
| 5,460,502 A * | 10/1995 | Majercak | 425/116 |
| 5,520,874 A | 5/1996 | Chou et al. | 264/328.4 |
| 5,603,879 A | 2/1997 | Osada et al. | 264/102 |
| 5,846,477 A * | 12/1998 | Hotta et al. | 264/511 |
| 6,444,157 B1 * | 9/2002 | Miyajima | 264/511 |
| 6,743,389 B2 * | 6/2004 | Miyajima et al. | 264/272.17 |
| 2003/0102587 A1 * | 6/2003 | Kobayashi et al. | 264/40.5 |
| 2006/0093692 A1 * | 5/2006 | Miyajima et al. | 425/129.1 |

* cited by examiner

*Primary Examiner* — Yogendra N Gupta
*Assistant Examiner* — Jeremiah Smith
(74) *Attorney, Agent, or Firm* — Ostrolenk Faber LLP

(57) ABSTRACT

A compression molding system comprising first and second mold halves is provided for an electronic device wherein a plurality of cavities are formed in the first mold half corresponding to molding locations on the electronic device. A plurality of plungers are located in the first mold half, each of which is drivable against a side of a respective cavity for applying a compacting force to encapsulation material located in the cavity during molding. A motor is operatively connected to the plungers for driving the plungers relative to the cavities.

15 Claims, 7 Drawing Sheets

COMPRESSION MOLDING OF AN ELECTRONIC DEVICE

FIELD OF THE INVENTION

The invention relates to the molding of an electronic device, and in particular to compression molding using encapsulation material such as liquid epoxy molding compound.

BACKGROUND AND PRIOR ART

Conventionally, transfer molding is performed for encapsulating electronic devices wherein molding compound is introduced as a solid pellet into a pot of a molding system and melted with the application of heat and pressure to a liquid state. The liquefied molding compound is then forced by a plunger into runners connected between the plunger and molding cavities to enter into molding cavities. An example of a transfer molding system is disclosed in U.S. Pat. No. 5,520,874 entitled "Compressible Mold Plunger".

The disadvantage of conventional transfer molding systems is that the use of epoxy molding compound is inefficient, resulting in wastage. Such wastage is typically found in the culls, runners and gating system of the mold, which are discarded after molding. The ratio of the molding compound wasted as compared to the molding compound used may be as high as 0.2:1.

In modern packaging technology, semiconductor chips or dice are becoming increasingly thinner. The separation distances between wires connected to the semiconductor dice are also becoming smaller. Moreover, more complicated structures such as stacked dice have been developed. In these cases, a high epoxy injection speed from conventional transfer molding will damage the dice or wires. Furthermore, complicated die and wire structures make it difficult for encapsulation material to perfectly fill a molding cavity.

To avoid the said wastage and to overcome the problems associated with molding delicate or complicated die and wire structures, one approach is to dispense liquid encapsulation material directly on top of the electronic devices to be molded, and then compressing the molding material to encapsulate the electronic devices and to form the desired shape of the electronic package.

An example of such a compression molding approach is disclosed in U.S. Pat. No. 6,743,389 entitled "Resin Molding Machine and Method of Resin Molding". The resin molding machine therein comprises a lower die on which a work piece to be molded is set and an upper die clamping the work piece with the lower die. A clamper is provided to the upper die to enclose a resin molding space of the upper die, the clamper being capable of vertically moving in the upper die and always biased downward, wherein a lower end of the clamper is downwardly projected from a resin molding face of the upper die when the lower die and upper die are opened. A resin molding surface of the clamper compresses the molding compound during molding.

A problem faced with this approach is that the compression force is provided by the clamper's biasing spring force. Such spring force is of a limited range. As the package size increases, the molding cavity has to be made bigger and a greater compression force is therefore required to provide a larger compacting force by the clamper during molding of a greater volume of encapsulation material. In such cases, the spring force may be inadequate to reliably compress the molding compound to form a molded package. As a result, the molded product is defective. It would be desirable to develop a system for compression molding of electronic devices of larger package sizes that is more effective than solely using a spring's compression force to provide the compacting force.

SUMMARY OF THE INVENTION

It is thus an object of the invention to seek to provide a compression molding system capable of exerting a greater compacting force during molding than that which may be provided by a spring when molding larger electronic packages.

It is another object of the invention to seek to provide a compression molding system in which a compression force is variable according to a required package size in order to reliably mold semiconductor packages of various sizes.

It is yet another object of the invention to seek to introduce a vacuum system to obtain molded packages that are more precisely shaped by avoiding voids in the encapsulation material and/or overflow of encapsulation material outside the molding cavity.

According to a first aspect of the invention, there is provided a molding system for molding an electronic device comprising: first and second mold halves; a plurality of cavities in the first mold half corresponding to molding locations on the electronic device; a plurality of plungers located in the first mold half, each of which is drivable against a side of a respective cavity for applying a compacting force to encapsulation material located in the cavity during molding; and a motor operatively connected to the plungers for driving the plungers relative to the cavities.

According to a second aspect of the invention, there is provided a method of molding an electronic device comprising the steps of: closing first and second mold halves together to clamp onto the electronic device, the first mold half having a plurality of cavities corresponding to molding locations on the electronic device; driving a plurality of plungers located in the first mold half against the sides of the respective cavities using a motor that is operatively connected to the plungers, whereby to apply a compacting force to encapsulation material located in the cavity during molding.

It will be convenient to hereinafter describe the invention in greater detail by reference to the accompanying drawings, which illustrate one embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of a molding system in accordance with the invention will now be described with reference to the accompanying drawings, in which.

DETAILED DESCRIPTION OF THE PREFERRED EMBODIMENT OF THE INVENTION

Figure 1:
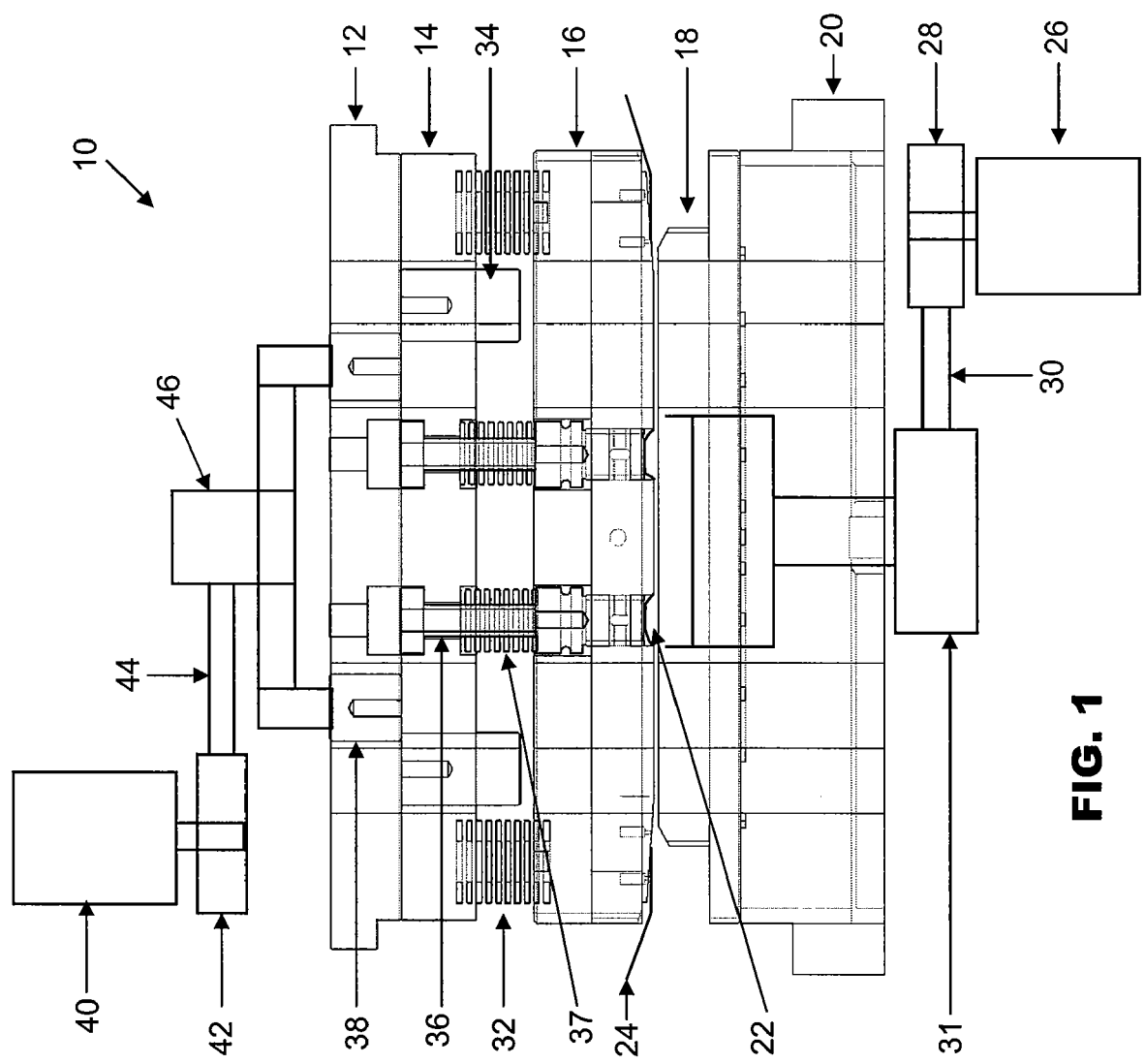
FIG. 1 is a sectional view of a molding system according to the preferred embodiment of the invention.

FIG. 1 is a sectional view of a molding system 10 according to the preferred embodiment of the invention. The molding system 10 generally comprises first and second mold halves, such as top and bottom mold halves that are movable relative to each other. The top mold half comprises a base portion comprised of a top base plate 12 and a middle plate 14. The top mold half also includes a top cavity strip 16. The top cavity strip 16 is resiliently attached to the middle plate 14 of the base portion, such as by way of springs 32. The bottom mold half comprises a bottom cavity strip 18 and a bottom base 20. An electronic device is receivable on the bottom cavity strip 18 for molding.

In the illustrated embodiment, only a top side of the electronic device clamped in the molding system 10 will be covered by encapsulation material. The top cavity strip 16 includes a number of cavities 22 at positions where encapsulation material is to be molded onto the electronic device. A length of film 24 is further laid over the molding side of the top cavity strip 16 and is used to cover molding surfaces of the cavities 22 during molding.

In this preferred embodiment of the molding system 10, the top mold half is drivable to move relatively towards the bottom mold half by a motor (not shown), to clamp the electronic device for molding. Preferably, encapsulation material in the form of liquid encapsulant has already been dispensed directly onto the electronic device. In other embodiments where the molding cavities are located on the bottom mold half, the encapsulation material may be dispensed directly onto such molding cavities formed in the bottom mold half. Once the electronic device is clamped securely, the encapsulation material is formed into the shape of the cavities 22.

The top mold half includes a plurality of plungers 36 that are movable within the top cavity strip 16 of the top mold half. Each of the plungers 26 is drivable against a side of a respective cavity 22, so as to provide a compacting force to the encapsulation material located in the cavity 22 during molding. When the plungers 36 are retracted, they create a gap between the sides of the cavities 22 and the bottom surfaces of the plungers 36. When the plungers 36 are fully extended, they close onto the sides of the cavities 22 to compact the encapsulation material therein and to form a desired shape of the molded compound on the electronic device. Each plunger 36 may further be provided with an extension spring in the form of a plunger spring 37 mounted between the plunger 36 and the middle plate 14 of the base plate that biases against the driving force from the servo motor 40 to provide resilience when extending the plunger 36.

The plungers 36 are operatively connected to the middle plate 14, which is in turn operatively connected to push pillars 38 in the top base plate 12 in order to allow all the plungers 36 to be operated simultaneously to drive them relative to the cavities 22. In order to drive the push pillars 38 to operate the plungers 36 through driving the middle plate 14, a force may be activated to push the push pillars 38 by any suitable means to provide an adequate compacting force. In the preferred embodiment illustrated in FIG. 1, the pushing force is actuated by a motor, such as a servo motor 40. The servo motor 40 is operatively linked to the push pillars 38 through a top gear box and linkage mechanism 46, transmitting the driving force via a pulley 42 and belt 44 mechanism. The top gear box and linkage mechanism 46 relays an actuating force originating from the servo motor 40 onto the push pillars 38.

As the middle plate 14 moves towards the top cavity strip 16, a stopper 34 stops motion of the middle plate 14 at a predetermined distance from the top cavity strip 16 to maintain a separation distance between the middle plate 14 and the top cavity strip 16. At this point, the plungers 36 have closed onto the sides of the cavities 22 for compacting the encapsulation material, and motion of the plungers 36 is also stopped at the sides of the cavities 22.

Springs 32 are further arranged on the top mold half between the middle plate 14 and the top cavity strip 16 to provide a preload force therebetween in order to bias the middle plate 14 to separate from the top cavity strip 16. When the servo motor 40 is switched off, the springs 32 cause the middle plate 14 to move away from the top cavity strip 16 to rest at its standby position.

A portion of the bottom mold half corresponding to the position of the electronic device may also be drivable against the electronic device using a motor, such as a servo motor 26, to provide a further compression force. The servo motor 26 is connected to the bottom base 20 through a mechanism comprising a pulley 28 and a belt 30. When the belt 30 is rotated by the servo motor 26, the portion of the bottom mold is driven upwards relative to the bottom base 20 and bottom cavity strip 18 by a bottom gear box and linkage mechanism 31 to move towards the top cavity strip 16 to provide the further compression force.

Figure 2:
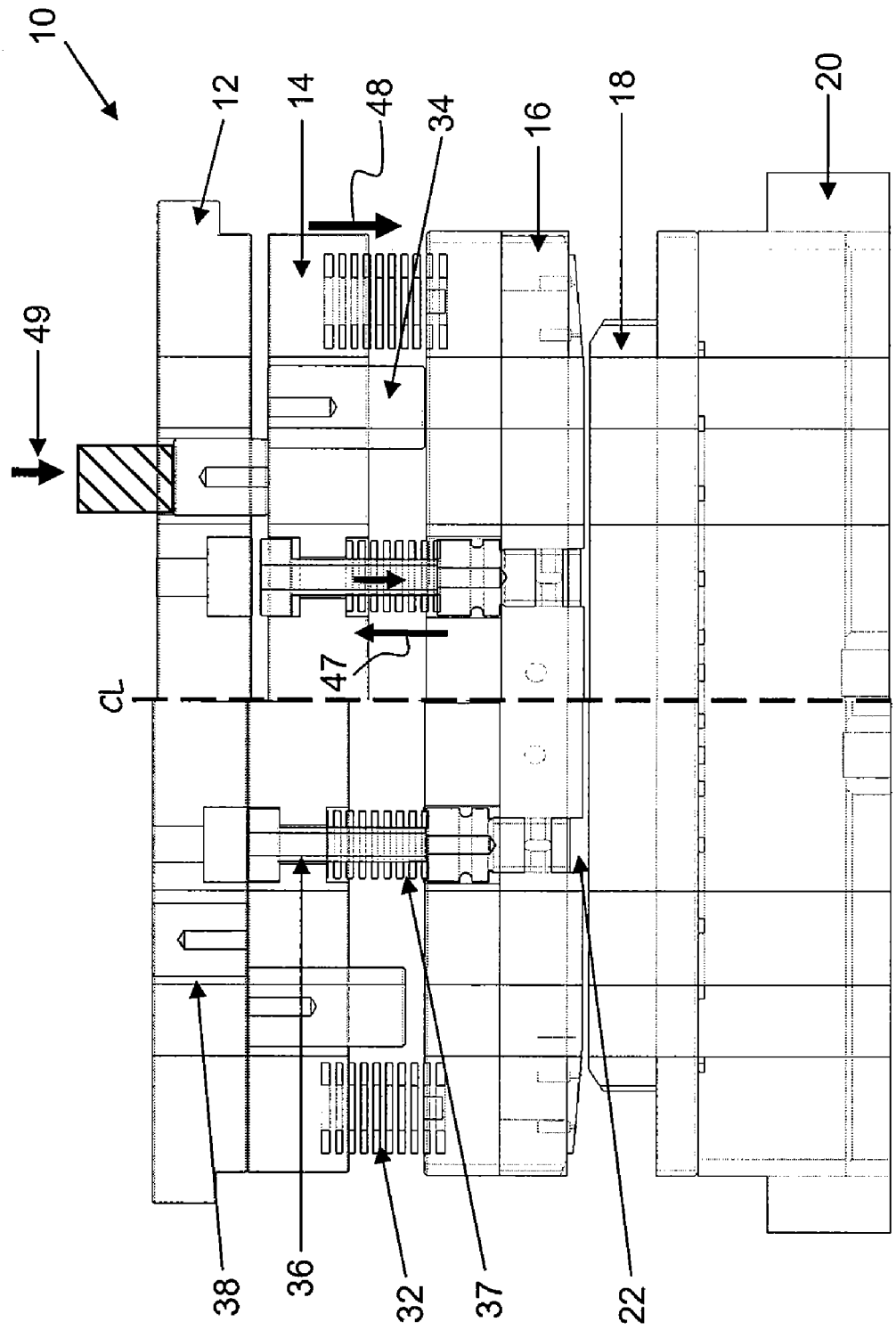
FIG. 2 is a sectional view of the molding system illustrating actuation forces acting on the molding system during molding.

FIG. 2 is a sectional view of the molding system illustrating actuating forces acting on the molding system 10 during molding. The top cavity strip 16 is first clamped against the bottom cavity strip 18. Substantially simultaneously or thereafter, the servo motor 40, pulley 42, belt system 44 and top gear box and linkage mechanism 46 exert a compression force 49 against the push pillars 38 to push the middle plate 14 downwards 48, which also pushes the plungers 36 against the sides of the cavities 22.

The plungers 36 apply a compacting force onto the encapsulation material inside the cavities 22 to mold the electronic device. The plunger springs 37 provide a compensation force 47 to introduce resilience in the plungers 36. Thus, the plungers 36 are configured to provide an active compacting force onto the cavities 22 by the use of a controllable actuating means such as a motor in the form of the servo motor 40 described above, as opposed to the prior art which only offer spring forces to provide the compacting force.

After molding is completed, the servo motor 40 is deactivated and the spring 32 automatically separates the middle plate 14 from the top cavity strip 16. The top cavity strip 16 is then lifted away from the bottom cavity strip 18 and the electronic device can be removed.

Figure 3:
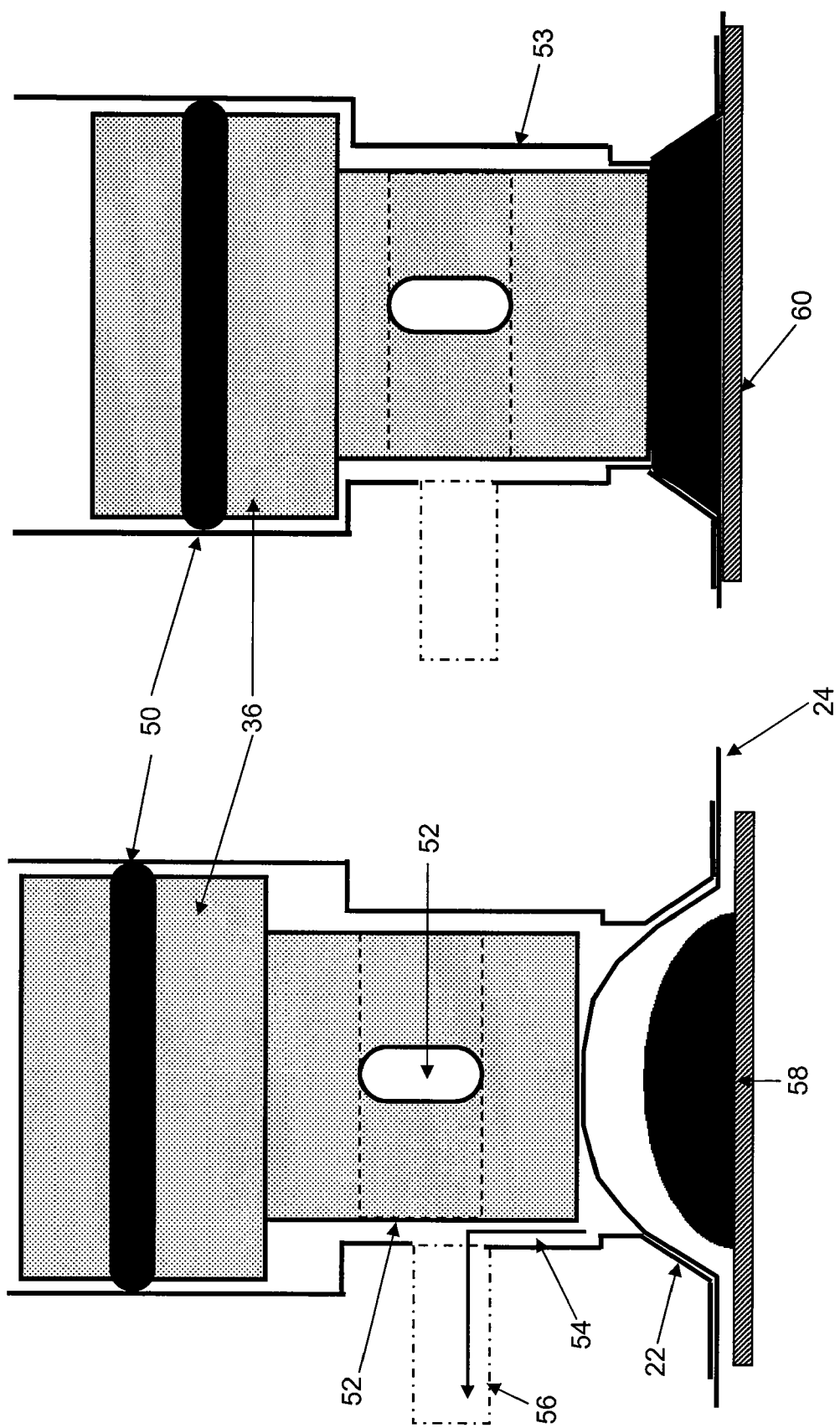
FIG. 3 is a cross-sectional view of a cavity and plunger showing vacuum channels for drawing air from the cavity.

FIG. 3 is a cross-sectional view of a cavity 22 and plunger 36 showing vacuum channels for drawing air from the cavity 22 through a passage 53 within which the plunger 36 is movably mounted. In the first illustration, the mold is open and the plunger 36 is retracted from a top portion of the molding cavity 22. The film 24 separates the molding surfaces of the top cavity strip 16 and the plunger 36 from the device to be molded. Then, the top cavity strip 16 is closed onto the device, and the plunger 36 is extended.

During this process, air is preferably drawn from the cavities 22 through the passage 53 to allow greater compliance between the film 24 and the walls of the cavities 22. This facilitates the formation of the shape of the molded compound by avoiding having the encapsulation material being squeezed out by the film 24 during molding. The plunger 36 has a seal such as an O-ring 50 that serves to seal off the end of the plunger 36 and the cavity 22 from the ambient atmosphere.

A vacuum channel 56 is connected to a side wall of the passage 53 between the O-ring 50 and the cavity 22 for drawing air out of the cavity 22 using a vacuum suction source (not shown). Vacuum slots 54 are formed along side walls of the conduit which form partial indentations in the side walls of the passage 53 and introduce air gaps between the plunger 36 and the side walls of the passage 53. Suction holes 52 are formed in the plunger 36 near the end thereof. These suction holes 52 are interconnected to enable fluid communication between the separate vacuum slots 54 in the passage 53. They also improve vacuum efficiency from the vacuum channel 56, such that the film 24 will not be sucked downwards by other vacuum sources such as bottom air channels 66 (see FIG. 6).

FIG. 3 also shows liquid encapsulant 58 that has been dispensed directly onto the electronic device, which is in the form of substrate 60, before closing the top and bottom mold halves. Since the liquid encapsulant 58 has already been introduced onto the substrate 60, there is no need for runners that are found in conventional transfer molding systems to be connected to the cavities 22. After the top cavity strip 16 closes onto the substrate 60, the plunger 36 is closed onto the cavity 22 to be appropriately aligned with a top side of the cavity 22. The film 24 thus conforms to the side walls of the cavity 22 and a bottom surface of the plunger 36 and the liquid encapsulant 58 conforms accordingly to the shape of the cavity 22 that is covered by the film 24 without the presence of air gaps in the molded compound.

Figure 4:
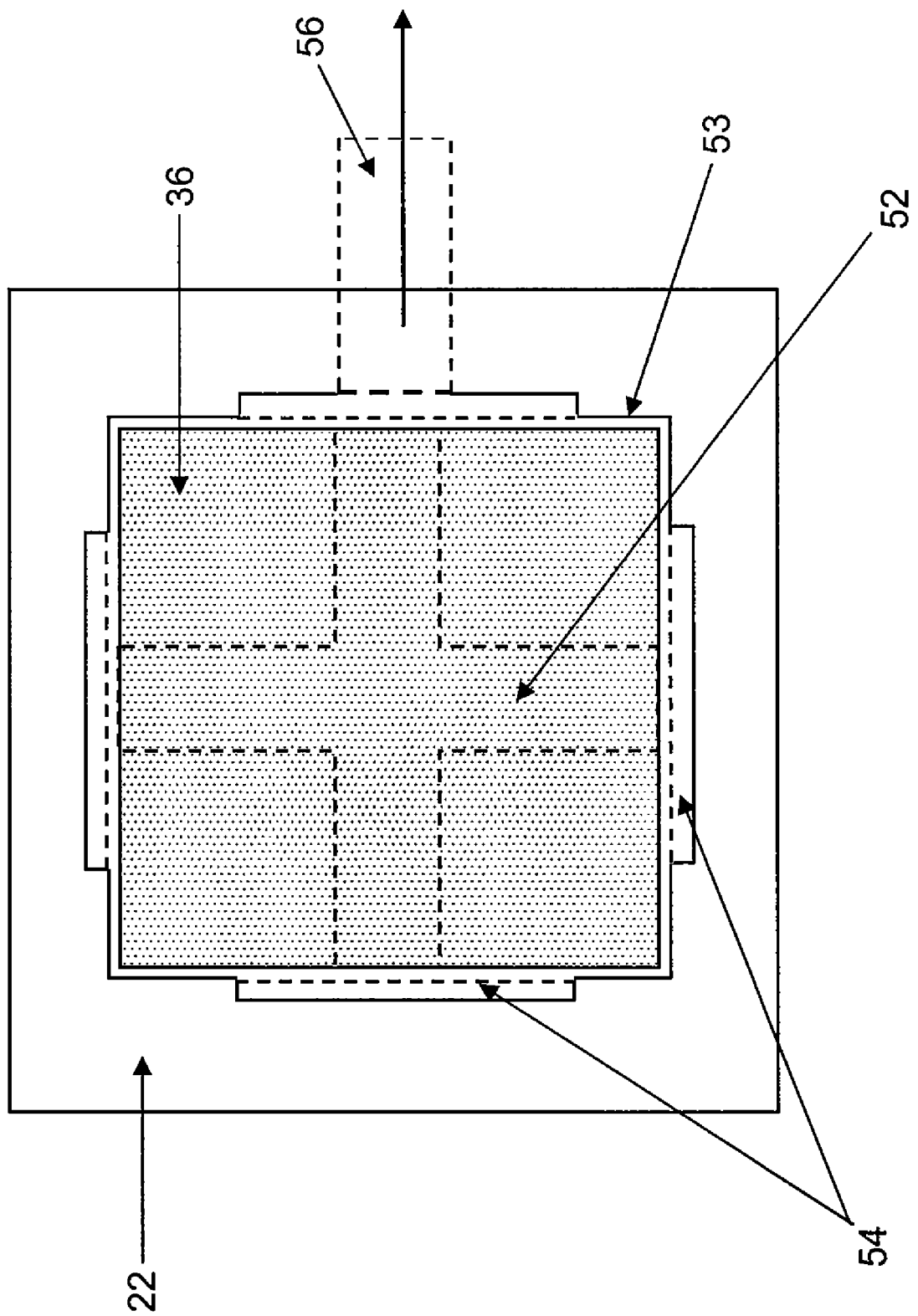
FIG. 4 is a top view of a plunger indicating the structure of the suction holes in the plunger.

FIG. 4 is a top view of a plunger 36 indicating the structure of the suction holes 52 in the plunger 36. The suction holes 52 are linked and interconnected in the shape of a cross and each opening of the suction holes 52 opens out to a vacuum slot 54 which extends towards the cavity 22. Thus, the suction holes 52 may comprise openings that are adjacent to all the side walls of the passage 53 to interlink all the vacuum slots 54. The vacuum channel 56 is connected to the vacuum slot 54 on one side of the walls of the passage 53. In this manner, when vacuum suction is generated, the whole of the top portion of the molding cavity 22 experiences vacuum suction to closely conform the film 24 to the respective molding surfaces.

Figure 5:
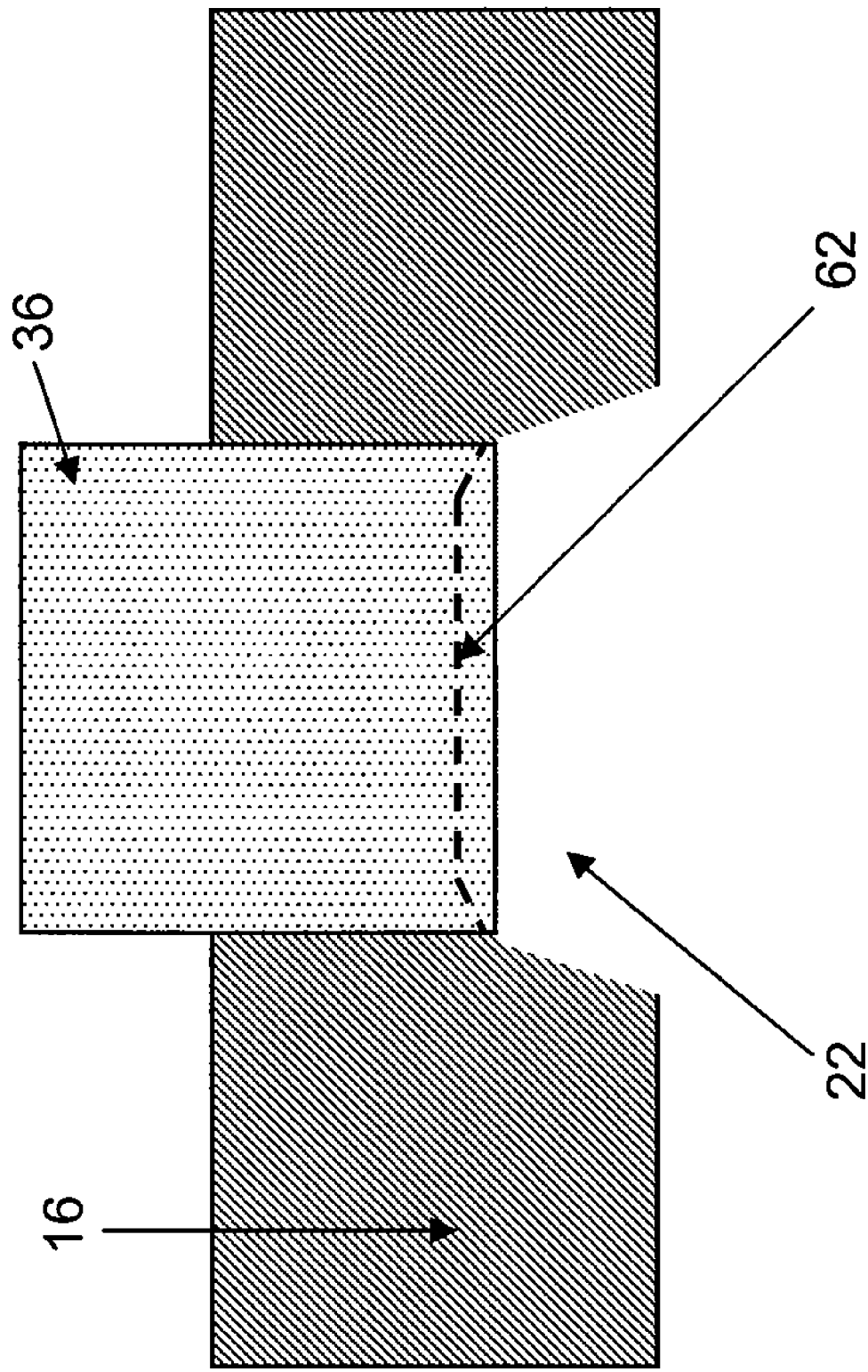
FIG. 5 is a cross-sectional view of a plunger that has a concave molding face.

FIG. 5 is a cross-sectional view of a plunger 36 that has a concave molding face 62 for applying the compacting force against the encapsulation material. It was found that if the tolerance between the molding surfaces of the plunger 36 and the cavity 22 is not well-controlled, a part of the film 24 may enter into a gap between the two surfaces. This induces protrusions on the edges of a molded package corresponding to the position of the gap, resulting in the edges of the molded package being higher than the rest of the package.

The concave molding face 62 of the plunger 36 helps to compensate for film deformation at the package edge area during molding. Furthermore, the film 24 is prevented from entering into the gap between the plunger 36 and the cavity 22. By having this concave molding face 62, one is able to maintain flatness of the top of the cavity and of the molded package when molding the liquid encapsulant 58 on the substrate 60.

Figure 6:
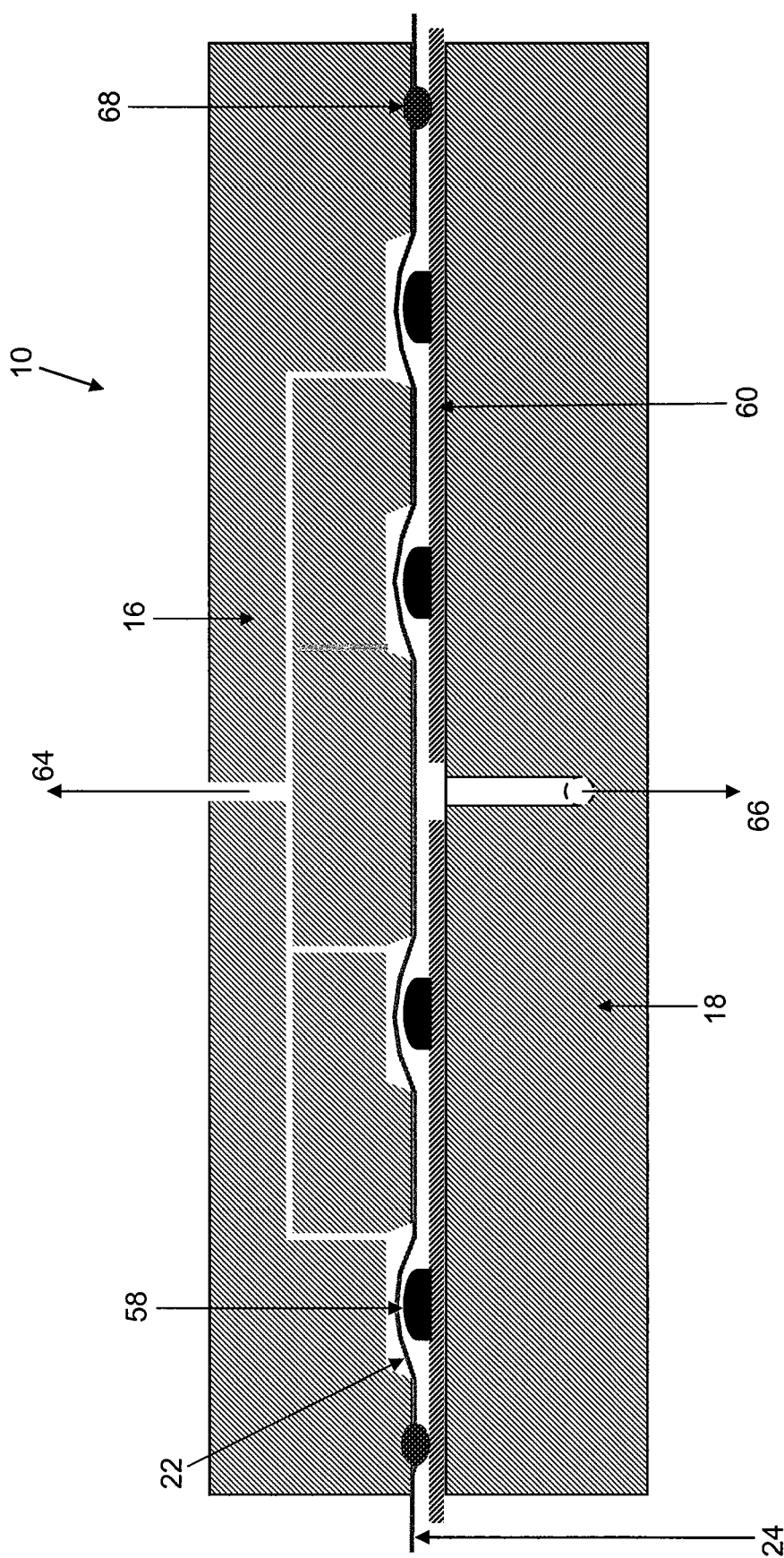
FIG. 6 is a cross-sectional view of the molding system illustrating an air evacuation system for the cavities.

FIG. 6 is a cross-sectional view of the molding system 10 illustrating an air evacuation system for the cavities 22. A network of top air channels 64 formed inside the top cavity strip 16 are linked to the cavities 22 as well as an external vacuum suction source (not shown) to evacuate air out of the cavities 22. Furthermore, one or more bottom air channels 66 are formed in the bottom cavity strip 18 to draw air which is entrapped by the film 24 between the top and bottom cavity strips 16, 18 out of the cavities 22, to avoid the risk of internal voids or incomplete fill. An O-ring 68 is also located around a periphery of the top cavity strip 16. This O-ring 68 is resilient and presses onto the substrate 60 and/or the bottom cavity strip 18 to seal the cavities 22 off from the ambient atmosphere during molding.

Figure 7A:
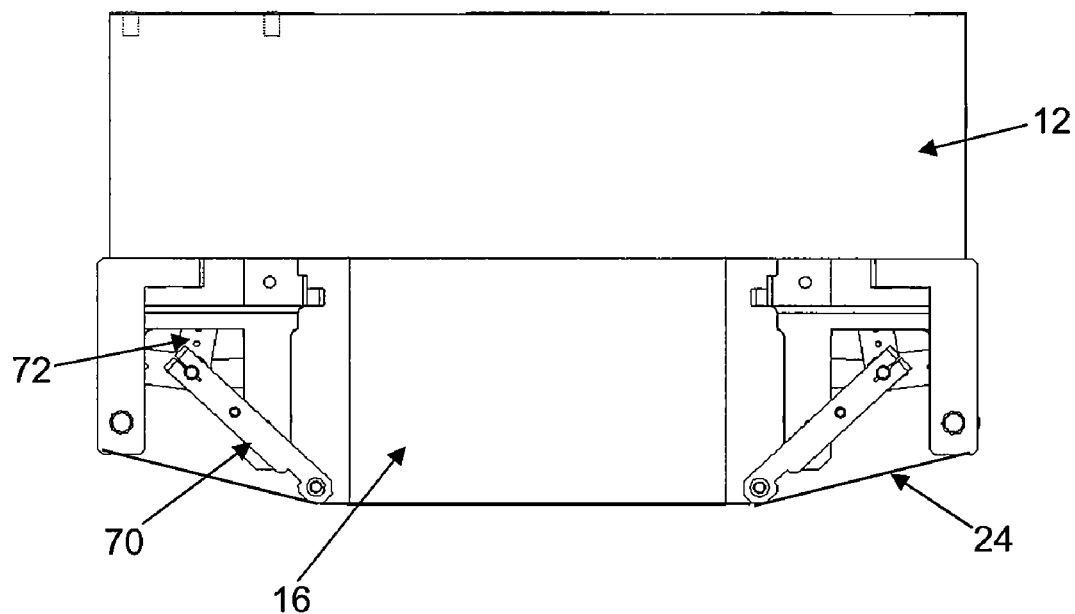
FIG. 7 is a cross-sectional view of the molding system illustrating a mechanical film separator device according to the preferred embodiment of the invention.
Figure 7B:
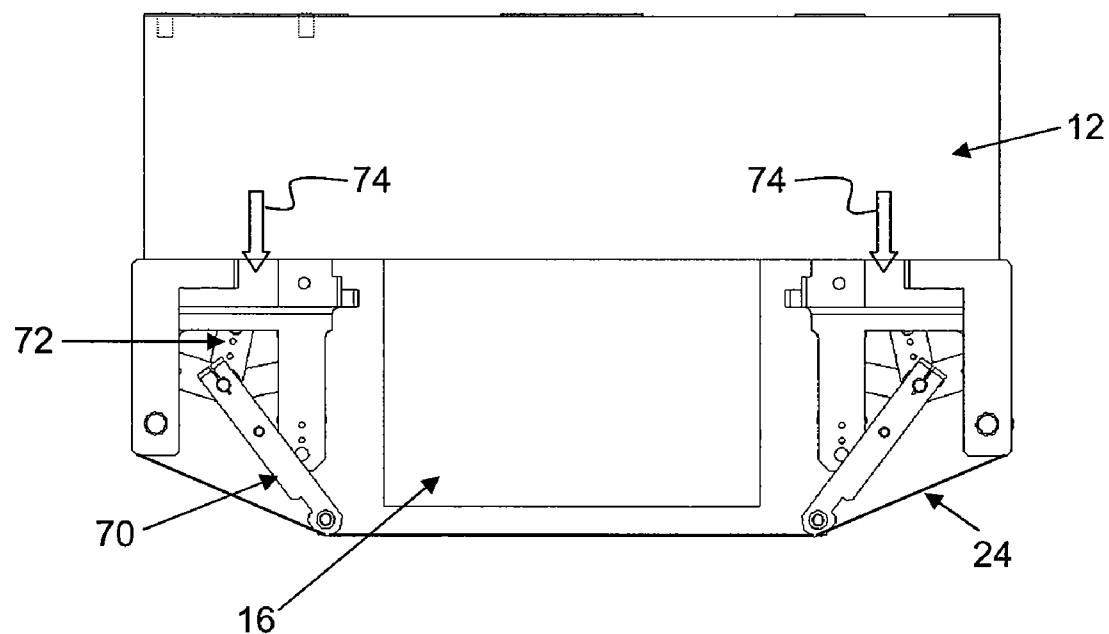

FIG. 7 is a cross-sectional view of the molding system illustrating a mechanical film separator device 70 that is attached to the top mold half. The film separator device 70 is movable between a retracted position where it is located behind a lower molding surface of the top cavity strip 16 (see FIG. 7(*a*)) to allow the film to rest on the lower molding surface, and an extended position where it is extended beyond the lower molding surface of the top cavity strip 16 (see FIG. 7(*b*)), to separate the film 24 from the lower molding surface. In the illustrated embodiment, a lever 72 may be operatively connected to the film separator device 70 such that a pushing force 74 acting on the lever pushes the film separator device 70 to the extended position.

The film 24 usually needs to be changed after a predetermined number of substrates 60 are molded, as the film 24 becomes worn. The film separator device 70 reliably separates the film 24 from the lower molding surface of the top cavity strip 16 when it is extended. This avoids the film 24 sticking onto the top cavity strip 16 and makes it easier for the film 24 to be rolled so that fresh film 24 can be introduced at the position of the lower molding surface of the top cavity strip 16 to perform further molding.

It should be appreciated that the molding system 10 as described in the preferred embodiment of the invention is cost-efficient as wastage of encapsulation material is reduced. As compared to the prior art, the molding system 10 also applies a more reliable compression force onto the encapsulation material. The compression force can even be accurately adjusted according to need. Moreover, an effective air evacuation system ensures conformity of the film 24 to the molding cavity 22 and reduces the risk of creation of voids. Another advantage is that the plungers' concave molding surfaces avoid protrusions being induced at the edges of the packages, so that well-formed molded packages can be achieved.

The invention described herein is susceptible to variations, modifications and/or additions other than those specifically described and it is to be understood that the invention includes all such variations, modifications and/or additions which fall within the spirit and scope of the above description.

The invention claimed is:

1. Molding system for molding an electronic device comprising:
   first and second mold halves operable to close against each other to clamp the electronic device therebetween;
   the first mold half comprising a cavity strip including a plurality of cavities corresponding to molding locations on the electronic device, the first mold half further comprising a base plate and a middle plate located between the cavity strip and the base plate, the middle plate being movably connected to the base plate, and the first mold half comprising springs connecting the middle plate to the cavity strip and separating the middle plate from the cavity strip, the entire first mold half being drivable with respect to the second mold half to close the cavity strip against the second mold half to clamp the electronic device;
   a plurality of plungers fixedly attached to the middle plate, each of the plungers being drivable relative to both the first and second mold halves against a side of a respective cavity for applying a compacting force to an encapsulation material located in the respective cavity during molding;

a motor operatively connected to the plungers, the motor being operable to drive the plungers relative to the cavities and relative to both the first and second mold halves after the first and second mold halves have clamped the electronic device, a second motor connected to the second mold half, the second motor being operable to drive a portion of the second mold half against the cavity strip to provide a further compacting force on the encapsulating material after the first and the second mold halves have clamped the electronic device; and wherein each plunger comprises a molding face for applying the compacting force against the encapsulation material and ensuring that a top surface of a molded package is substantially flat, the molding face consisting of a single recessed cavity having a concave peripheral portion receding to a flattened central portion.

2. Molding system as claimed in claim 1, wherein the springs are configured to provide a preload force for separating the cavity strip and the middle plate.

3. Molding system as claimed in claim 1, further comprising a stopper located between the middle plate and the cavity strip, the stopper being operative to stop motion of the plunger at the side of the respective cavity.

4. Molding system as claimed in claim 1, further comprising push pillars located in the base plate and connecting the plurality of plungers to the motor, wherein the plungers are drivable by driving the push pillars.

5. Molding system as claimed in claim 1, wherein the each plunger is movable by the motor between a first position, in which a gap is formed between the each plunger and the respective cavity, and a second position, in which the gap is closed and the each plunger pushes against the side of the respective cavity.

6. Molding system as claimed in claim 1, further comprising extension springs mounted between the plungers and the first mold half, the extension springs biasing against a driving force of the motor to provide compensation against the compacting force.

7. Molding system as claimed in claim 1, wherein the motor comprises a servo motor.

8. Molding system as claimed in claim 1, including a passage in the first mold half, the plunger being movably mounted within the passage, and the molding system further including a vacuum channel connected to a side wall of the passage for drawing air away from the respective cavity.

9. Molding system as claimed in claim 8, further comprising a seal mounted on the each plunger such that the vacuum channel is located between the respective cavity and the seal for preventing loss of vacuum through the passage.

10. Molding system as claimed in claim 8, further comprising vacuum slots formed along side walls of the passage, the vacuum slots forming partial indentations in the side walls and introducing air gaps between the each plunger and the side walls of the passage.

11. Molding system as claimed in claim 10, wherein the each plunger further comprises an end and suction holes located near the end, the suction holes being interconnected and providing fluid communication between separate vacuum slots in the passage through the suction holes.

12. Molding system as claimed in claim 11, wherein each suction hole of the each plunger comprises an opening adjacent to a side wall of the passage.

13. Molding system as claimed in claim 1, further comprising a film covering at least a molding surface of one of the mold halves, and comprising a film separator device attached to the one of the mold halves, the film separator device being movable between a retracted position and an extended position, the retracted position being a position behind the molding surface so as to allow the film to rest on the molding surface, and the extended position being a position located beyond the molding surface so as to separate the film from the molding surface.

14. Molding system as claimed in claim 13, further comprising a lever operatively connected to the film separator device, the lever being operable to receive a pushing force to push the film separator device to the extended position.

15. Molding system as claimed in claim 1, wherein the molding cavities are configured to mold a liquid encapsulant that is dispensed for molding the electronic device before the first and second mold halves are closed.

* * * * *